United States Patent [19]

Brunner et al.

[11] Patent Number: 5,043,073
[45] Date of Patent: Aug. 27, 1991

[54] METHOD AND APPARATUS FOR CLEARING TOXIC SUBSTANCES FROM BIOLOGICAL FLUIDS

[75] Inventors: Gorik Brunner, Hanover; Bernd Mathieu, Spiesen, both of Fed. Rep. of Germany

[73] Assignee: Fresenius AG, Bad Homburg von der Hohe, Fed. Rep. of Germany

[21] Appl. No.: 785,036

[22] Filed: Oct. 8, 1985

Related U.S. Application Data

[63] Continuation of Ser. No. 420,576, Sep. 20, 1982, abandoned.

[30] Foreign Application Priority Data

Sep. 24, 1981 [DE] Fed. Rep. of Germany ....... 3138107

[51] Int. Cl.⁵ .............................................. B01D 61/28
[52] U.S. Cl. ................................. 210/646; 210/321.72
[58] Field of Search ................... 55/16; 210/646, 645, 210/638, 490, 491, 500.2, 34.3, 321.72, 643

[56] References Cited

U.S. PATENT DOCUMENTS

| | | | |
|---|---|---|---|
| 3,228,877 | 1/1966 | Mahon | 210/651 X |
| 3,734,851 | 5/1973 | Matsumura | 210/646 X |
| 3,779,907 | 12/1973 | Li | 210/643 |
| 3,856,475 | 12/1974 | Marx | 55/159 X |
| 3,956,112 | 5/1976 | Lee et al. | 210/644 |
| 4,214,020 | 7/1980 | Ward et al. | 55/16 X |
| 4,410,794 | 11/1968 | Li | 210/643 |

FOREIGN PATENT DOCUMENTS

| | | |
|---|---|---|
| 1619867 | 3/1971 | Fed. Rep. of Germany . |
| 3333067 | 11/1972 | Fed. Rep. of Germany . |
| 2148098 | 3/1973 | Fed. Rep. of Germany . |
| 2434550 | 2/1975 | Fed. Rep. of Germany . |
| 2518742 | 11/1975 | Fed. Rep. of Germany . |

OTHER PUBLICATIONS

Halwachs et al, "Liquid Membrane Enzyme Reactor for Artificial Liver Support", pp. 219-229.
Marr, Chem-Ing-Tech., vol. 52, pp. 399-410 (1980).
Lang et al, "Monograph", pp. 46-53.

*Primary Examiner*—Frank Spear
*Attorney, Agent, or Firm*—Omri M. Behr

[57] ABSTRACT

A method and apparatus are provided for clearing toxic substances from biological fluids by using at least one microporous diaphragm whose pores are filled with a liquid, which is immiscible with the biological fluid, a washing fluid flows past one face of the diaphragm while the biological fluid flows past the opposite face of the diaphragm. The microporous diaphragm is made of a hydrophobic polymer and the immiscible liquid is a highly refined mineral oil, a highly hydrogenated plant oil, a highly hydrogenated animal oil or, a dimethylated silicone.

38 Claims, 2 Drawing Sheets

METHOD AND APPARATUS FOR CLEARING TOXIC SUBSTANCES FROM BIOLOGICAL FLUIDS

This is a continuation of application Ser. No. 420,576, filed Sept. 20, 1982, which was abandoned upon the filing hereof.

BACKGROUND OF THE INVENTION

1. Field of the Invention

The present invention relates to a method and apparatus for clearing toxic substances from biological fluids, specifically blood, in which the fluid (the word "fluid" being used herein in the sense of liquid) flows along one side of at least one microporous diaphragm, whose pores are filled with a fluid which is not miscible with the biological fluid, while the other side of the diaphragm is contacted by a moving or flowing washing fluid.

In the case of acute liver failure, there is likely to be a complete loss of the detoxtying function of this organ for some time. This loss is especially important since in the case of liver failure, high levels of toxins are endogenically produced, causing inhibition of cerebral functions, resulting in a comatose condition; furthermore, the detoxitying function of the still-intact liver cells is thereby inhibited. In later stages, different aspects of the condition cause cumulative deterioration so that, in the end, death of the patient takes place.

Normally such toxins, which generally comprise phenols, mercaptans and fatty acids, are changed chemically, that is to say, by hydroxylation and conjugation in the liver itself into a water-soluble form, so that they may be excreted through the kidneys. This operation takes place enzymatically; for example materials such as phenols and the like are coupled/converted with the help of uridinediphosphoglucuronyl transferase (UDPGT) to glucuronides, which are soluble in water and may be excreted through the kidneys.

2. Description of the Prior Art

A great number of attempts have been made at using enzymatic conversion for clearing toxins from the human body of patients suffering from liver coma. For example, heterologous liver homogenates or slices of liver tissue, from which blood has been separated, suitably by dialysis, through a diaphragm, were used. Regrettably a quick loss in activity was noted within a short time and furthermore the exchange of toxins occurred very slowly if at all. Unfortunately, the use of a complete animal liver did not give rise to the desired effect, because of tissue incompatibility and it was not possible to supply nourishment thereto to the necessary degree.

For this reason, more and more suggestions were made to employ adsorbing materials, more specifically active charcoal, for the wider use of hemoperfusion (see the monograph by Brunner and Schmidt, Artificial Liver Support, Springer-Verlag, Berlin, 1981, starting at page 46). Such a process is, however, very unspecific since not only toxins, but a surprising number of other substances (which are important for supporting vital functions) which are taken from the blood. For example, the level of hormones in the blood goes down to nearly zero so that such treatment, on balance, gives rise to damaging effects.

Hemodialysis, in which water soluble products of metabolism are cleared from the body, is an unspecific way of separating substances. Thus toxins, which are normally hydrophobic, are not, as a rule, adequately cleared from the patient's body by this approach.

For this reason, experiments have been carried out with a liquid diaphragm enzyme reactor (see Brunner, et al, supra, page 219) for separating liver toxins by suing liquid diaphragm technology, which in the form noted earlier, was the result of the basic research work of Li; (see for example German patents 1,619,867, 2,222,067, 3,410,794, 3,779,907 etc.). Liquid diaphragm technology may be looked upon as extraction and stripping processes taking place at the same time, in which a dispersed emulsion is used in place of a simple solvent, as the separating phase. The term "liquid diaphragm" is generally used for the liquid components of a multi-emulsion, separating two liquids which, as a rule, are miscible with each other. For this reason blood or serum, containing the toxins to be cleared from the body therein, comprise one phase in which droplets are emulsified, the faces of such droplets forming the liquid diaphragm. These droplets for their part have a second phase separated within this diaphragm, the second phase comprising the reactant, as for example, the extracting liquid.

Such an emulsion is produced by the dropwise addition of the reactant to a liquid with a different polarity which contains surface-active substances. Thus an aqueous solution may be run dropwise into a long-chain hydrocarbon, as for example liquid paraffin, the latter preferably containing ionically surface-active materials, so that a stable emulsion is formed containing the aqueous solution in the form of droplets trapped within it. The liquid paraffin being responsible for forming the spherical outer face or layer, that is to say the liquid diaphragm. The stabilizing of such an emulsion is achieved by the effect of the surface-active substances, which are in fact bipolar reagents which, on the one hand, are solvated with the normally hydrophobic hydrocarbon chain by the liquid paraffin and, on the other hand, is solvated at their hydrophilic, normally ionic end group, by the water.

Such an emulsion is mixed with the liquid or fluid containing the material to be separated. If, for example, as noted in Brunner, et al. supra starting at page 219, phenol or naphthol is used in the form of an aqueous suspension and, if this solution is mixed with a liquid diaphragm emulsion having an enzyme solution trapped therein, it will be seem that the hydrophobic liquid diaphragm layer will be penetrated by the hydrophobic phenol, which will be contacted by the enzyme phase and thus changed by some form of conversion process into a hydrophilic reaction product, which can no longer diffuse back through the hydrophobic diaphragm. Hence, one of the most damaging toxins may be cleared from a system by extraction with a liquid diaphragm.

Although it might well seem that the extraction with liquid diaphragm technology is especially useful, there is the undesired effect such emulsions have to be again separated from the system which is to be cleaned or washed, this gives rise to a further working step. The separation of the emulsion is undertaken by separation of two phases, namely by centrifugation or by the addition of an emulsion breaking substance. In the first case, it is regrettably not possible to ensure that no traces of the emulsion remain in the system to be cleaned, furthermore, when the overall system is acted upon by high centrifugal forces, such forces especially in the case of biological fluids such as blood, destroy the blood corpuscles. Finally, the use of emulsion breaking substances is not possible with biological fluids, because these are generally toxic and, for this reason, may not be used for this purpose.

The natural separation of emulsions from an aqueous system has turned out to be impossible in the special case of biological fluids, because certain serious effects are produced, if such liquid diaphragm emulsions are put into direct contact with the blood.

Chem.-Ing.-Tech. 52 (1980), pages 399 to 410, discloses an account of supported liquid diaphragms made of polymeric microporous diaphragms, whose micropores are filled with organic liquids. These supported liquid diaphragms give the desired effect in the case of certain extraction operations, thus it should be possible to use this principle generally with diaphragms with the right properties. The correct constitution of such a supported liquid diaphragm for the processing of biological fluids has not previously been worked out, because such diaphragms have to be kept to rigid conditions. Such diaphragms have to be compatible with respect to the biological fluid, specifically blood and have to be filled with completely non-toxic liquids which, moreover will not become separated from the porous diaphragm. Furthermore, such diaphragms must have a very high level of separating efficiency to give the desired separation within the shortest possible treatment times.

However, this paper does not teach how these desired effects are to be produced and, in fact, is more directed to general observations on liquid diaphragm technology.

SUMMARY OF THE INVENTION

One purpose of the invention is to design a method and an apparatus with which biological fluids, specifically blood, may be quickly and efficiently freed of toxic substances.

A further purpose of the invention is to design such a system in which the liquid in the diaphragm does not become separated or detached therefrom.

As part of a still further purpose or object of the invention, the supported liquid diaphragm used in such a system should be compatible with the biological fluid and non-toxic.

The microporous diaphragm of this invention is a hydrophobic polymer and the immiscible liquid is a highly refined mineral oil, an animal and/or plant oil, which is highly hydrogenated or a dimethylated silicone.

The supported liquid diaphragm used in the invention is not only compatible with blood, but furthermore the liquid within the diaphragm is not separated from the same. In in vitro tests, it has been shown that the hydrophobic organic liquid within the hydrophobic diaphragm is generally kept completely in the microporous diaphragm so that even after one hour of operation of such a diaphragm, no separation of the organic liquid from the hydrophobic diaphragm may be seen optically.

Highly toxic, hydrophobic substances are selectively dissolved from the aqueous system using this supported liquid diaphragm so that the purposes of the invention are in fact fully effected. Thus, part of the present invention is the discovery of a separating system for biological fluids, which, on the one hand, is compatible with blood without any separation of the liquid which is in the diaphragm, and, on the other hand, is highly selective, so that toxic substances may be efficiently cleared from the blood. For this reason, it is possible for toxic substances, present in the blood in the case of liver coma, to be efficiently cleared without any irreversible damage to the liver.

The present invention gives better results than known liquid diaphragm technology, since it is no longer necessary for emulsions to be produced. Thus, it is not necessary for special reactants to be used for covering liquid diaphragms and it furthermore not necessary for the emulsion itself to be mixed with the system and to have to be cleaned. Finally it is no longer necessary for the emulsion to have to be separated from the system, so that complex separation steps are unnecessary and the system to be cleaned does not have to be freed from the liquid diaphragm emulsion.

The process of the present invention comprises the following working steps:

A polymeric diaphragm, which suitably is one having the same polarity properties as the liquid diaphragm, is soaked with the liquid used to form the liquid diaphragm. If for example a hydrophobic substance, such as liquid paraffin or the like is used as a liquid diaphragm, a hydrophobic polymeric diaphragm will be soaked with this liquid.

The liquid to be cleaned is caused to flow along one face of the soaked diaphragm, while the cleaning system flows on the other side thereof. The materials present in the aqueous system (for example, blood) such as the said liver toxins, then, because of their hydrophobic structure, permeate through the hydrophobic liquid diaphragm comprising the hydrophobic liquid and the polymeric diaphragm support and thus on the other side of the diaphragm, come into contact with the cleaning system, which suitably will change the materials which are to be separated, into a form which will prevent the reverse diffusion thereof. For example phenols may be processed enzymatically using the reactions which have been referred to above so that the hydrophilic glucuronides which are produced are kept in the cleaning system itself and whose diffusion is no longer possible through the hydrophobic liquid diaphragm. On the other hand, compounds with a weakly acidic reaction such as phenols, mercaptans and fatty acids, may be changed into ionic form by reaction with the basic reactants such as sodium hydroxide and in the ionic form there is no chance of their diffusing back through the liquid diaphragm.

After processing by the method of the present invention the liquid to be cleaned will, generally speaking, have been freed of the toxic substances and may then be sued again for the desired purpose. The cleaning liquid will have the separated impurities therein and may be discarded, or, after being freed of such impurities, may be used again.

In the known liquid diaphragm process the emulsion to be used has to be produced in situ, that is to say at the site where it is to be used, on the other hand the polymeric diaphragm may be soaked with the liquid forming the liquid diaphragm, at a production facility, may be later prepared for use at the patient's bedside and, after cleaning operation, may be discarded or reprocessed for further use. Thus a set of filters, made up of diaphragms, for cleaning blood maybe soaked with the desired liquid diaphragm system and pre-sterilized at the production facility so that they may be used at once at the bed of the patient. For this reason, it is no longer necessary to use a reactor in which the blood is mixed with the liquid diaphragm emulsion (as in the prior art) whereafter it has to be separated therefrom without it being possible to be certain that the emulsion has in fact, completely separated.

In the process of the invention the two phases are kept separate from each other by a solid, polymeric diaphragm, which is used as a support for the liquid diaphragm and which in the unfilled condition will, generally, not be permeable by the two liquids. Thus, where a hydrophobic diaphragm is used between two aqueous systems, diffusion between the two liquids will not be possible unless high pressure is used on one side or unless the diaphragm has been specially conditioned earlier on so as to let water through.

After the cleaning operation, this soaked filter may be discarded without any special processing of the liquid diaphragm. The liquid diaphragm is so strongly fixed to the polymeric support that not only will it not become separated from it to any noticeable degree but also will not let pin-holes come into existence, through which the two separated liquids might become mixed.

BRIEF DESCRIPTION OF THE DRAWINGS

The invention is illustrated by the following figures.

DETAILED DESCRIPTION OF THE INVENTION

Figure 1:
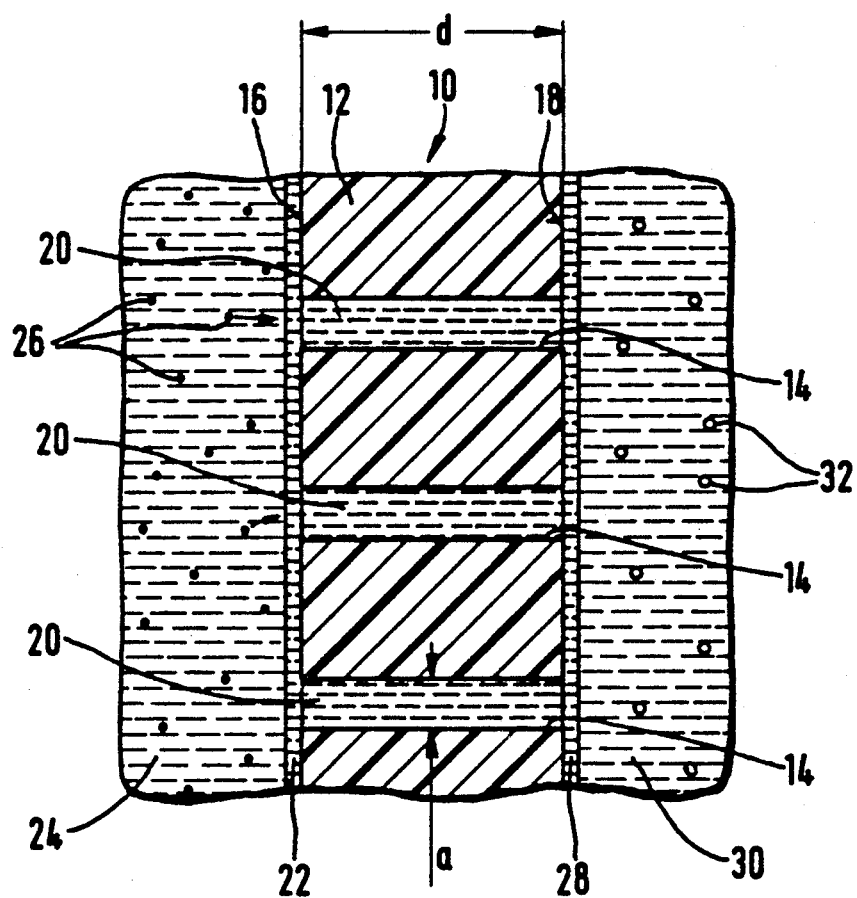
FIG. 1 is a schematic cross-sectional elevational view through a supported liquid diaphragm.

The contaminant to be removed by the process of the present invention from aqueous solutions, may be hydrophobic or hydrophilic, inorganic or organic. In this respect, generally the same result will be produced in the invention with respect to neutral, acidic or basic substances. However, the contaminants must be soluble, at least to a small degree, in the liquid forming the liquid diaphragm layer (see infra) for there to be any penetration thereof.

If the phase to be cleaned is blood, which for example, is to be freed of toxins present therein as a result of liver failure, the liquid selected as the liquid diaphragm phase, must on the one hand, have the property of solvateing the toxins at least to a small degree, and on the other hand of not being harmful to the patient and not attacking the blood.

The cleaning system, having the reactant (to react with the contaminant) therein, is so selected that on the one hand it provides a higher level of solubility for the substance to be separated than the liquid used for producing the liquid diaphragm, while on the other hand it can change the substance to be extracted into such a form that there can be no reverse or backward diffusion thereof through the liquid diaphragm.

More specially, the same liquids will be used as carriers for the phase to be extracted and for the reactant, suitably the liquid will be water. Between these two phases there is then, the generally two-dimensionally structured or positioned phase in the form of the liquid diaphragm made up of a solvent which is immiscible with the two aforesaid phases.

In extraction process, the contaminant to be extracted passes into the liquid diaphragm phase, and, after making contact with it, permeates the same. It then passes into the phase containing the reactant which will change it into a form which cannot reverse or backward diffuse. Thus it is not possible for any equilibrium to become established between the two phases, so the contaminant may be completely separated from the phase to be cleaned. This extraction naturally comes to an end if the phase to be cleaned has been completely extracted or an equilibrium condition comes into existence between the two phases with respect to the contaminant which is to separated. In such a case the backward reaction would be equalled by the forward reaction.

On the other hand, the occurrence of an equilibrium between the phases on either side of the diaphragm may be avoided where the phase with the cleaning substance is circulated in order to free it of the separated component. This component may, for example be taken up on, or separated by, an adsorption filter, an ion exchanger column, or the like so that the phase, again in its pure condition may once more flow past the liquid diaphragm.

In the method of the present invention it is for example possible for weakly acidic substances to removed, that is to say liver toxins such a phenols, mercaptans and fatty acids. For example in the phase containing the reactant, water may be the solvent and will contain uridine-5'-diphospho-glucorunate (UDPGA) and the UDPGA transferase for the separation of phenol, as set forth in the following flow chart.

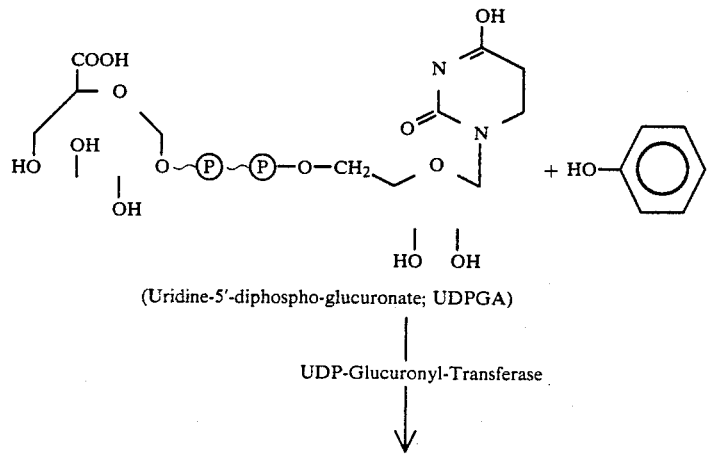

(Uridine-5'-diphospho-glucuronate; UDPGA)

UDP-Glucuronyl-Transferase

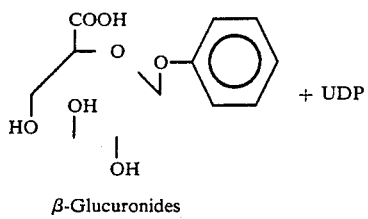

β-Glucuronides

With this method it is possible for the normally hydrophobic phenol to be changed into a water-soluble glucuronide, whose reverse duffusion is not possible.

For separating mercaptans, S-methyltransferase has turned out to be specially useful as an enzyme for transmethylating the mercaptans.

As a further useful enzyme, glutathione transferase may be used for conjugating glutathione and certain polycyclic hydrocarbons.

A further very useful system has turned out to be cytochrome-p-450 together with NADPH-cytochrome-p-450-reductase, which may be used for certain hydroxylating reactions.

Furthermore sulfate transferase may be used together with the co-factor PAPS.

In addition to these listed enzymes, such weakly acidic compounds may naturally be changed into an ionic form without any reverse diffusion properties by using the right bases as reactants, for example NaOH, KOH, $K_2CO_3$ or organic amines.

On the other hand, however, the contaminants to be separated may be complexed in a complex forming reaction, for example with ADTA, changed by adjustment of the pH value into an other structure, changed by a redox reaction into an other electron condition and/or cleared from the reactor by physical adsorption.

It is of course possible for other enzymes, as for example enzymes which may be used in industry, such as phenolases or the like, to be used. Furthermore, it is possible for other reactions as well, to be used for separating the contaminants if they can change the substance to be separated into a non-reverse permeating form On the other hand, however, weakly basic compounds such as $NH_3$, which is also a strong toxin for the human organism, may be separated using the right strong acid as a reactant. Acids which may be used here are, for example, the inorganic mineral acids such as HCL, $H_2SO_4$ etc.

Dissolved substances may be precipitated reagent and thus changed into a non-reverse permeable form. Thus for example, heavy metal ions may be separated by reaction with $H_2S$ and hydrocyanic acid may be separated by reaction with silver ions, although the toxicity of this latter separating reagent should be taken into account.

The permeation of ions through the liquid diaphragm may be assisted by providing the diaphragm with special additions for interaction with and dissolution of the ions.

A polyfunctional sulfonic acid, a polyfunctional carboxylic acid or a polyfunctional organophosphoric acid may be incorporated in the liquid diaphragm layer in the form of ion exchanger compounds to expedite the separation of cations from the aqueous solution. These ion exchanger compounds generally have a molecular weight of 200 to 10,000 and a ratio of carbon atoms to the functional group of over 5.

Examples of such ion exchanger compounds, are styrene derivations such as, for example, sulfonated styrene copolymers, styrene-maleic acid copolymers, styrene-acrylic polymers, styrene-acrylic copolymers, naphthenic acids and the like.

Similarly, anions may be separated by utilizing polyfunctional amines in the form of their ion exchangers. For this purpose, styrene derivatives with quaternary ammonium groups may be used.

By changing the nature of the liquid diaphragm along these lines, its penetration by ions may be amplified so that the separation thereof will be quicker.

The selection of the solvent for the liquid diaphragm phase is determined by which solvents are to be used to solvate and the reactant. In the case of biological fluids this solvent will be water. As a reactant, water may also be used, since it has useful properties in this respect. It is also possible for a solvent to be used for producing the liquid diaphragm which is the same as the contaminant solvent.

If water, which is polar, is used as the contaminant solvent, the solvent for producing the liquid diaphragm will generally be a non-polar solvent, which, will only have a low solubility in water.

Examples for solvents which are not soluble in water or are immiscible therewith, are long chain hydrocarbons, especially paraffins or isoparaffins, halogenated hydrocarbons, ethers, higher oxygenated compounds such as alcohols, ketones, acids and esters. Furthermore silicone oils, other oils and more specially plant and animal oils, naphthenes and aromatic compounds with a molecular weight of up to 1000 may be used.

For use with humans, highly refined mineral oils are more suitable for this purpose. Furthermore, plant and animal oils may be used with good effect if, preferably, they have been highly hydrogenated, that is to say so as to have at least 10% more hydrogen than is present on normal saturation.

Dimethylated silicones may also be used, as may perhalogenated long-chain hydrocarbons.

Such solvent are marketed by Merck of Darmstadt, Germany, as "Paraffindickflussig" (low-viscosity liquid paraffin), by ESSO as "Bayol 90" or "S 100N" and by Bayer as Siliconol A (A silicone oil) etc.

These solvents have a viscosity of 1 to 500 and more spectically 10 to 200 cSt at normal body temperature.

For producing a two-dimensional liquid diaphragm, the two-dimensional support is saturated with the said liquid, the support suitably having the same polar properties as the solvent for producing the liquid diaphragm. Thus the liquid, soaks readily into the support.

Preferably, the support itself is a diaphragm, that is to say only letting through certain substances of a certain size. This separating property will naturally be dependent on the number of diaphragm openings therein. For this reason, the average diameter of the diaphragm opening will have a bearing on the selection of the particles. In the present invention the diameter of the diaphragm openings will have a bearing on the selection of the particles. In the present invention the diameter of a diaphragm opening will be such that the liquid therein, after being soaked up into the diaphragm, is so strongly fixed or adhered in position that it is not forced out of the opening even at a gage pressure of up to 200 mm water column.

The thickness of the diaphragm must also be addressed because it is controlling for the length of the opening and, for this reason, the distance or length of motion of the permeating substances to be separated. This distance is inversely proportional to the permeation speed so that the diaphragm is best made as thin as possible if a high separation speed is desired.

It has been seen in connection with the present invention that diaphragms may be used as plasma filters in artificial kidneys. Diaphragms may be in the form of sheets or in the form of hollow threads. While a flat diaphragm has a two-dimensional structure, a hollow thread is in the form of duct through which one of the two phases may make its way, the diaphragm openings stretching out radially through the wall.

Such filters, if in the form of a flat diaphragm, are made up of a number of stacked diaphragm layers or, if they are in the form of hollow threads, they will be in the form of a group of such hollow threads placed within a housing and having their ends placed in a sealant. These two sorts of filters make it possible for the two liquids to be run and out of the apparatus through inlet and outlet connections.

Examples of polymeric materials for such diaphragms are poly(aromatic)amides such as polyamide-benzoichydrazide, polycarbonates, polysulfones, polyethers, ester of polyacrylic acid, polyethylene, polypropylene, polybutenese, polyurethanes, polyisolbutylene, polystyrenes, polyvinylethers, polyesters, PTFE etc.

Polyethylene and polypropylene are more suitable and a hollow thread made of polypropylene and marketed by Enka AG as PS 504 or 510 is specially preferred.

It is best if the diaphragm thickness is in the range of 1 to 500 and suitably 10 to 300 or, preferably 30 to 200 microns.

The maximum opening or pore width may furthermore have any value within a wide range, the range being usefully 0.01 to 100 and especially 0.01 to 20 or, preferably, 0.2 to 10 microns.

The liquid diaphragm of the present invention is produced by soaking the support diaphragm with the liquid until all pores of the support diaphragm have been filled up with the soaking liquid, it being equally well possible for the liquid to be run through the filter, made up of number of such diaphragms or for the filter to be directly dipped into the liquid. Normally, all of the liquid will be soaked up into the filter so that, before saturation of the diaphragm, the filter will not give up any liquid. Once this point has been reached, that is to say one liquid comes out of the filter, the soaking operation may terminated.

It has turned out to be especially useful if the soaking operation is undertaken in the producing facility so that the filter, after sterilization there as well, may at once be used without any further processing at the bed of the patient.

Such a processed and conditioned filter may be cleaned a great number of times without the liquid, forming the liquid diaphragm, coming out of the diaphragm holes or pores. If, however, there is any such loss of liquid, the diaphragm, which is hydrophobic as well, will not permit any exchange between the two said liquids so that no mixing thereof will take place. For this reason, a highly specific separating reaction may take place over a long stretch of time without any undesired side effects and without any permeation of particles, who diameter is greater than the diameter of the pores while on the other hand the liquid diaphragm is responsible for selective extraction and, for this reason, there are no undesired further forms of extraction.

The method of the invention may be practiced at any temperature at which the liquid diaphragm and the supporting diaphragm are stable. Normally, the method will be practiced at room temperature or at the body temperature of the patient.

Furthermore, pressure is not critical, but it has to be at such a level that the liquid diaphragm is not damaged, that is to say so that the liquid is not pushed out of the diaphragm pores. It is preferred not to apply using any pressure across the diaphragm thus the dissolved substance and not the solvent itself makes its way through the diaphragm.

FIG. 1 illustrates an expanded view for liquid diaphragm 10 of the present invention. It comprises a polymeric diaphragm 12 of thickness d, which is generally equal to the permeation distance. The polymeric diaphragm 12 has a number of pores or openings 14 running all the way through the diaphragm 12 so the substances, whose diameter is smaller than that of the pores (with a diameter a) may make their way through pores 14.

Diaphragm 12 itself is made up of one of the number of materials listed, more specifically polypropylene and may, as we have seen, have the form of a hollow thread diaphragm or a flat diaphragm or sheet.

The two faces 16 and 18 of the diaphragm 12 and pores 14 are coated and, in the other case, filled with liquid 20. Liquid 20 will generally have the same polar properties as the support diaphragm 12 so that not only are all the pores 14 filled with liquid 20, but furthermore the faces 16 and 18 are coated with a film of liquid 20. The face 16 coated with the film 22 of liquid 20 is in contact with the (generally) aqueous solution 24 which contains the particles 26 which are to be separated or cleared. Such particles 26 may be non-polar or polar nature, although they are more usually of non-polar nature so that they may be readily extracted by the liquid 20 which is also normally non-polar. The permeation direction of such particles is marked with the arrow.

After particle 26 has made its way into the layer 22 and moved along and through pore 14, which is full of liquid 20, it comes up against layer 28 which is placed on the other face 18 of the diaphragm 12. This layer 28 is in contact with liquid 30 having the reactant 32 therein which undergoes reaction with the particle 26 to the separated so that a non-penetrating form thereof is produced.

The process of the invention may naturally be used not only for cleaning biological fluids by separating endogenic toxins, but furthermore for separating exogenic toxins from such fluids, for example for clearing an overdose of any medicament from the body of a patient.

EXAMPLE

A filter made up of about 30 hollow threads was used which, at one end, were joined up with the liquid to be cleaned, which then made its way through the spaces within the threads. The threads themselves were placed in a vessel having four openings, that is to say two openings joined with the end of the hollow thread diaphragms while the two other openings were joined with the space in the vessel outside the threads. The ends of the threads of the two ends of the vessel were sealed off from the space within the vessel outside the threads. The liquid with the reactant was run into one of the two last-named openings before making its way along the outer faces of the hollow thread diaphragms.

The hollow thread diaphragm was made of polypropylene as marketed by Enka AG under the number PS 510. Such threads have an inner duct with an average diameter of 0.35 mm, a wall thickness of 0.15 mm and a maximum pore diameter of 0.55 micron. The active face or area is equal to 70 sq. cm.

Before undertaking the cleaning operation, the filter is filled with a 1 to 1 mixture of a high viscosity liquid paraffin and low viscosity liquid paraffin such as those mentioned above and manufactured by Merck, Darmstadt, Germany, any one of the openings in the vessel being used. The pores of the supporting diaphragms quickly become full of the liquid paraffin, that is to say at the latest after 1 minute. Before use, the diaphragm is washed out of the blood side with physiological saline. The liquid diaphragm supported by the further diaphragm is now ready for use.

As liquid to be cleaned there is employed 40 ml of an aqueous solution of 2 mmole/l naphthol in 100 mmole/l tris-buffer, the solution being pumped at a rate of 2 ml/min. for circulation. On the other side the wash solution is 13 ml of enzyme solution. The enzyme solution is made up of a preparation of UDP-glucuronlytransferase with the addition of UDPGA thereto. The protein level of the enzyme solution is equal to 4 mg/ml and that if UDPGA is equal to 1.92 mmole/l. The specific activity of the enzyme solution with respect to naphthol is eaual to 30 micromole/min.mg.. The enzyme solution is circulated at a rate of 0.36 ml/min.

Figure 2:
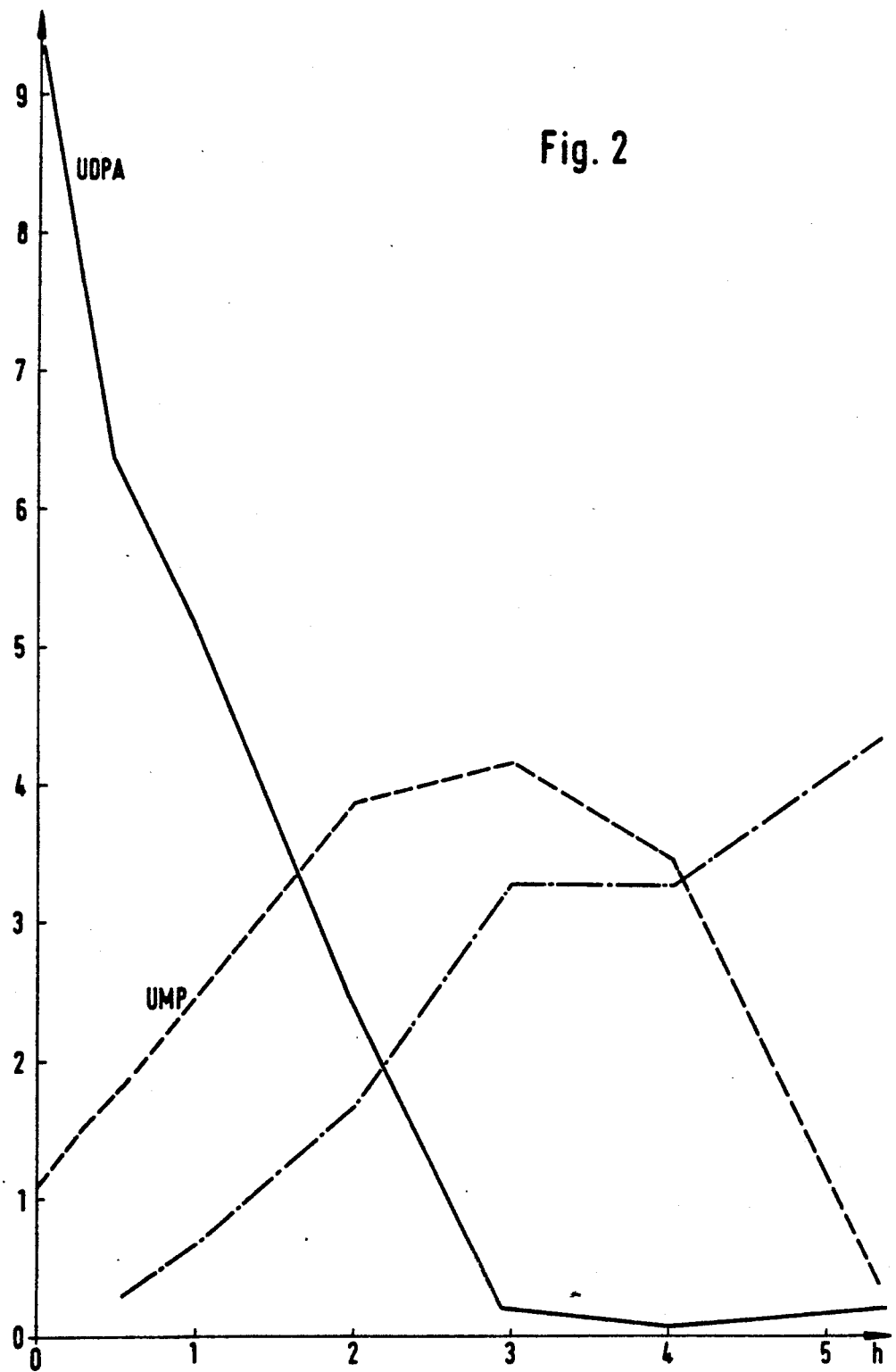
FIG. 2 is a plot against time of consumption of the enzyme and production of UDP glucuronide in the clearing of naphthol.

The outcome of the reaction may be seen in FIG. 2, in which the decrease in UDPGA and the production of UMP (uridine monophosphate) and of the glucuronide may be seen. It will furthermore be seen that the reaction is clearly only dependent on the UDPGA level, which in this reaction is completely used up. At the same time the concentration of the glucronide goes up, this making it clear that the naphthol is being separated from the liquid to be cleaned.

We claim:

1. In a method for clearing a toxic substance from a biological fluid in the case of which the fluid makes its way along one side of at least one microporous diaphragm, whose pores are filled with a liquid which is immiscible with the biological fluid, while the other side of the diaphragm is contacted by an aqueous moving or flowing separating fluid, the improvement residing in that the microporous diapragm is a hydrophobic polymer and the immiscible liquid is a liquid selected from the group: a highly refined mineral oil, a highly hydrogenated plant oil, a highly hydrogenated animal oil, a dimethylated silicone.

2. The method as claimed in claim 1, wherein the diaphragm has pores therein whose average diameter is so great that liquid, used for producing the liquid filled diaphragm, is kept on said diaphragm.

3. The method as claimed in claim 2 wherein said polymeric diaphragm has a thickness in the range of 1 to 500 microns.

4. The method claimed in claim 3 wherein the biological fluid is blood.

5. The method claimed in claim 3 wherein the biological fluid is blood.

6. The method as claimed in claim 2, wherein said polymeric diaphragm has a thickness in the range of 30 to 200 microns.

7. The method as claimed in claim 2, wherein said polymeric diaphragm has a thickness in the range of 0.1 to 100 microns.

8. The method claimed in claim 7 wherein the biological fluid is blood.

9. The method claimed in claim 7 wherein the biological fluid is blood.

10. The method as claimed in claim 1, wherein the diaphragm has pores therein whose average diameter is so great that liquid used for producing the liquid filled diaphragm, is pressure-resistantly kept in said diaphragm.

11. The method as claimed in claim 1, having a number of such polymeric diaphragms, such polymeric diaphragms being put together as a filter.

12. The method as claimed in claim 1, wherein said polymeric diaphragm is made of a material selected from the group consisting of polyvinyl alcohol, poly(aromatic)amides, polycarbonates, polysulfones, polyethers, esters of polyacrylic acid, polyethylene, polypropylene, polybutenes, polyurethanes, polyisobutylene, polystyrene, polyvinylethers, polyesters and PTFE.

13. The method as claimed in claim 12, wherein said polymeric diaphragm is made of polypropylene.

14. The method as claimed in claim 12, wherein said polymeric diaphragm is made of polypropylene.

15. The method claimed in claim 12 wherein the biological fluid is blood.

16. The method claimed in claim 12 wherein the biological fluid is blood.

17. The method as claimed in claim 1, wherein said liquid for producing said liquid filled diaphragm has a viscosity in a range of 1 to 500 cSt.

18. The method as claimed in claim 1, wherein liquid paraffins with a viscosity of 10 to 200 cSt body temperature are used.

19. The method as claimed in claim 1 wherein the immiscible liquid is high refined mineral oil, a highly hydrogenated plant oil, a highly hydrogenated animal oil, or a perhalogenated hydrocarbon.

20. The method as claimed in claim 19 wherein the immiscible liquid is a highly refined mineral oil, a highly hydrogenated plant oil, or a highly hydrogenated animal oil.

21. The method as claimed in claim 20 wherein the immiscible liquid is a highly refined mineral oil.

22. The method as claimed in claim 21 wherein the immiscible liquid is a paraffin.

23. The method as claimed in claim 21 wherein the biological fluid is blood.

24. The method as claimed in claim 21 wherein the biological fluid is blood.

25. The method as claimed in claim 19 wherein the biological fluid is blood.

26. The method as claimed in claim 19 wherein the biological fluid is blood.

27. The method claimed in claim 1 wherein the biological fluid is blood.

28. The method of claim 1 wherein the biological fluid is blood.

29. In an apparatus for separating toxins from blood comprising a housing,
   at least one microporous diaphragm within said housing, the pores of said diaphragm being filled with a blood immiscible liquid,
   at least two spaces in the housing being formed between each side of said diaphragm and said housing in such a manner that the only communication within the housing between said spaces is through the pores of said diaphragm, each of said spaces being provided with an inlet means and an outlet means,
   the improvement wherein
   the microporous diaphragm is made of a hydrophobic polymer incapable of being swollen by said immiscible liquid and the immiscible fluid is permeable to said toxins and is selected from the group consisting of highly refined mineral oil, a highly hydrogenated plant oil, a highly hydrogenated animal oil and dimethylated silicones.

30. The apparatus as claimed in claim 29, wherein said hydrophobic polymer is selected from the group: polyethylene, polypropylene.

31. The apparatus as claimed in claim 30, wherein said hydrophobic diaphragm is a hollow thread diaphragm made of polypropylene.

32. The apparatus as claimed in claim 29, wherein said liquid has a viscosity in the range of 1 to 500 cSt.

33. The apparatus as claimed in claim 29, wherein said hydrophobic diaphragm has a thickness in the range of 1 to 500 microns.

34. The apparatus as claimed in claim 29, wherein said hydrophobic diaphragm has a thickness in the range of 30 to 200 microns.

35. The apparatus as claimed in claim 29, wherein the average pore diameter in said microporous diaphragm is in the range of 0.01 to 100 microns.

36. The apparatus as claimed in claim 29, having a number of hollow threads of polypropylene diaphragm which is filled with liquid paraffin having a viscosity of 10 to 200 cSt at body temperature.

37. The apparatus as claimed in claim 29 wherein the immiscible liquid is highly refined mineral oil, a highly hydrogenated plant oil, or a highly hydrogenated animal oil.

38. The apparatus as claimed in claim 37 wherein the immiscible liquid is a highly refined mineral oil.

* * * * *